US006867707B1

(12) United States Patent (10) Patent No.: US 6,867,707 B1
Kelley et al. (45) Date of Patent: Mar. 15, 2005

(54) AUTOMATED ON-SITE METER REGISTRATION CONFIRMATION USING A PORTABLE, WIRELESS COMPUTING DEVICE

(75) Inventors: Raymond H Kelley, Raleigh, NC (US); John C. Sutton, III, Cary, NC (US); Donna L. Bruce, Raleigh, NC (US); Sasan H. Ardalan, Cary, NC (US)

(73) Assignee: Elster Electricity, LLC, Raleigh, NC (US)

( * ) Notice: Subject to any disclaimer, the term of this patent is extended or adjusted under 35 U.S.C. 154(b) by 486 days.

(21) Appl. No.: 10/128,851

(22) Filed: Apr. 24, 2002

(51) Int. Cl.⁷ .............................................. G08B 23/00
(52) U.S. Cl. ............................ 340/870.02; 340/870.11; 700/291; 702/57; 702/62; 379/21; 379/22.01
(58) Field of Search ...................... 340/870.11, 870.02; 700/291; 702/57, 62; 379/21, 22.01

(56) References Cited

U.S. PATENT DOCUMENTS

| | | | |
|---|---|---|---|
| 3,445,815 A | 5/1969 | Saltzberg et al. | 340/163 |
| 3,858,212 A | 12/1974 | Tompkins et al. | 343/100 CS |
| 3,878,512 A | 4/1975 | Kobayashi et al. | 340/168 R |
| 3,973,240 A | 8/1976 | Fong | 340/151 |
| 4,031,513 A | 6/1977 | Simciak | 340/152 T |
| 4,056,107 A | 11/1977 | Todd et al. | 130/27 R |
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,218,737 A | 8/1980 | Buscher et al. | 364/493 |
| 4,250,489 A | 2/1981 | Dudash et al. | 340/147 T |
| 4,254,472 A | 3/1981 | Juengel et al. | 364/900 |
| 4,319,358 A | 3/1982 | Sepp | 375/1 |
| 4,321,582 A | 3/1982 | Banghart | 340/310 R |
| 4,361,890 A | 11/1982 | Green, Jr. et al. | 375/1 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825.01 |
| 4,707,852 A | 11/1987 | Jahr et al. | 379/107 |
| 4,713,837 A | 12/1987 | Gordon | 379/93 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 2 222 898 A1 | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Desbonnet, J. et al., "System Architecture and Implementation of a CEBus/Internet Gateway," *IEEE Transactions on Consumer Electronics*, 1997, 43(4), pp. 1057–1062.
International Search Report issued in International Application No. PCT/US98/11170 Date of Mailing: Oct. 7, 1998.
International Search Report issued in International Application No. PCT/US98/19034 Date of Mailing: Feb. 1, 1999.
Internet Printout, http://www.ram.com BellSouth Wireless Data—Paging, Mobitex, Network, Business, Sep. 23, 1998: MOBITEX®: The Heart of Every BellSouth Solution, MOBITEX Features and Services: RAM Mobile Data White Paper, Feb. 1997, Narrowband PCS Technologies: What are the Options?: RAM Mobile Data White Paper, Nov. 1997, The Inherent Security of Data Over Mobitex Wireless Packet Data Networks, A RAM Mobile Data White Paper, Oct. 1995, Comparative Analysis of Coverage and Performance: RAM & Ardis, 1998.

(List continued on next page.)

*Primary Examiner*—Albert K. Wong
(74) *Attorney, Agent, or Firm*—Woodcock Washburn LLP (57) ABSTRACT

The invention is directed to a method and system for verifying an installation of an meter, for example, an electric power meter. The inventive method includes identifying the electric power meter to a central computer using a mobile computing device. The electric power meter receives computer-executable instructions from the central computer via the mobile computing device, and transmits meter information (e.g., power consumption readings, meter identification information, and meter location) to the central computer. The meter information received from the central computer is compared with meter information available at the electric power meter. The comparison may be accomplished visually by reading the meter and comparing the readings with the information received on the mobile computing device. Also, the comparison may be accomplished automatically by the mobile computing device based on the information it receives from the central computer and the information it receives from the electric power meter.

60 Claims, 6 Drawing Sheets

(List continued on next page.)

U.S. PATENT DOCUMENTS

| | | | | |
|---|---|---|---|---|
| 4,724,435 A | 2/1988 | Moses et al. | ............ | 340/870.13 |
| 4,728,950 A | 3/1988 | Hendrikson et al. | .... | 340/870.31 |
| 4,734,680 A | 3/1988 | Gehman et al. | ............. | 340/539 |
| 4,749,992 A | 6/1988 | Fitzmeyer et al. | ...... | 340/870.02 |
| 4,757,456 A | 7/1988 | Benghiat | .................... | 364/464 |
| 4,769,772 A | 9/1988 | Dwyer | ........................ | 364/300 |
| 4,783,748 A | 11/1988 | Swarztrauber et al. | ....... | 364/483 |
| 4,827,514 A | 5/1989 | Ziolko et al. | .................. | 380/48 |
| 4,839,645 A | 6/1989 | Lill | ........................ | 340/870.17 |
| 4,841,545 A | 6/1989 | Endo et al. | ....................... | 375/1 |
| 4,860,379 A | 8/1989 | Schoeneberger et al. | ....... | 455/5 |
| 4,862,493 A | 8/1989 | Venkataraman et al. | .... | 379/107 |
| 4,868,877 A | 9/1989 | Fischer | ......................... | 380/25 |
| 4,884,021 A | 11/1989 | Hammond et al. | ........... | 324/142 |
| 4,912,722 A | 3/1990 | Carlin | ............................ | 375/1 |
| 4,940,974 A | 7/1990 | Sojka | .................... | 340/825.08 |
| 4,940,976 A | 7/1990 | Gastouniotis et al. | .... | 340/870.02 |
| 4,958,359 A | 9/1990 | Kato | ............................. | 375/1 |
| 4,964,138 A | 10/1990 | Nease et al. | ....................... | 375/1 |
| 4,965,533 A | 10/1990 | Gilmore | ...................... | 331/18 |
| 4,972,507 A | 11/1990 | Lusignan | ..................... | 455/51 |
| 5,022,046 A | 6/1991 | Morrow, Jr. | .................... | 375/1 |
| 5,032,833 A | 7/1991 | Laporte | ................. | 340/825.02 |
| 5,053,766 A | 10/1991 | Ruiz-del-Portal et al. | ............ | 340/870.02 |
| 5,053,774 A | 10/1991 | Schuermann et al. | ......... | 342/44 |
| 5,056,107 A | 10/1991 | Johnson et al. | ................. | 375/1 |
| 5,067,136 A | 11/1991 | Arthur et al. | .................... | 375/1 |
| 5,079,715 A | 1/1992 | Venkataraman et al. | .... | 364/481 |
| 5,086,292 A | 2/1992 | Johnson et al. | ................. | 340/637 |
| 5,090,024 A | 2/1992 | Vander Mey et al. | ............ | 375/1 |
| 5,111,479 A | 5/1992 | Akazawa | ........................ | 375/1 |
| 5,115,448 A | 5/1992 | Mori | ............................. | 375/1 |
| 5,132,985 A | 7/1992 | Hashimoto et al. | ............ | 375/1 |
| 5,136,614 A | 8/1992 | Hiramatsu et al. | .............. | 375/1 |
| 5,142,694 A | 8/1992 | Jackson et al. | ............. | 455/67.1 |
| 5,151,866 A | 9/1992 | Glaser et al. | ................. | 364/483 |
| 5,153,837 A * | 10/1992 | Shaffer et al. | ................ | 705/412 |
| 5,155,481 A | 10/1992 | Brennan, Jr. et al. | .... | 340/870.02 |
| 5,160,926 A | 11/1992 | Schweitzer, III | ......... | 340/870.02 |
| 5,166,664 A | 11/1992 | Fish | ............................ | 340/539 |
| 5,177,767 A | 1/1993 | Kato | ............................. | 375/1 |
| 5,179,376 A | 1/1993 | Pomatto | ................ | 340/870.02 |
| 5,189,694 A | 2/1993 | Garland | ....................... | 379/106 |
| 5,194,860 A | 3/1993 | Jones et al. | ............. | 340/370.02 |
| 5,204,877 A | 4/1993 | Endo et al. | ....................... | 375/1 |
| 5,214,587 A | 5/1993 | Green | ................... | 364/464.04 |
| 5,225,994 A | 7/1993 | Arinobu et al. | .............. | 364/492 |
| 5,228,029 A | 7/1993 | Kotzin | ........................ | 370/95.1 |
| 5,229,996 A | 7/1993 | Bääckströom et al. | .... | 370/100.1 |
| 5,239,575 A | 8/1993 | White et al. | .................. | 379/107 |
| 5,239,584 A | 8/1993 | Hershey et al. | ................ | 380/28 |
| 5,243,338 A | 9/1993 | Brennan, Jr. et al. | .... | 340/870.02 |
| 5,252,967 A | 10/1993 | Brennan et al. | ........ | 340/870.02 |
| 5,260,943 A | 11/1993 | Comroe et al. | ............ | 370/95.1 |
| 5,270,704 A | 12/1993 | Sosa Quintana et al. | ....... | 340/870.02 |
| 5,280,498 A | 1/1994 | Tymes et al. | ..................... | 375/1 |
| 5,280,499 A | 1/1994 | Suzuki | ............................ | 375/1 |
| 5,285,469 A | 2/1994 | Vanderpool | ..................... | 375/1 |
| 5,287,287 A | 2/1994 | Chamberlain et al. | ....... | 364/483 |
| 5,289,497 A | 2/1994 | Jacobson et al. | ............... | 375/1 |
| 5,307,349 A | 4/1994 | Shloss et al. | .............. | 370/85.2 |
| 5,315,531 A | 5/1994 | Oravetz et al. | ............... | 364/550 |
| 5,319,679 A | 6/1994 | Bagby | ......................... | 375/106 |
| 5,329,547 A | 7/1994 | Ling | ............................. | 375/1 |
| 5,345,225 A | 9/1994 | Davis | ......................... | 340/635 |
| 5,359,625 A | 10/1994 | Vander Mey et al. | ............ | 375/1 |
| 5,381,462 A | 1/1995 | Larson et al. | ................ | 379/107 |
| 5,383,134 A | 1/1995 | Wrzesinski | ................. | 364/514 |
| 5,384,712 A | 1/1995 | Oravetz et al. | ............. | 364/550 |
| 5,387,873 A | 2/1995 | Muller et al. | ................ | 327/155 |
| 5,390,360 A | 2/1995 | Scop et al. | ................ | 455/34.2 |
| 5,406,495 A | 4/1995 | Hill | .......................... | 364/483 |
| 5,416,917 A | 5/1995 | Adair et al. | ................. | 395/500 |
| 5,420,799 A | 5/1995 | Peterson et al. | ............. | 364/483 |
| 5,432,507 A | 7/1995 | Mussino et al. | ........ | 340/870.03 |
| 5,432,815 A | 7/1995 | Kang et al. | .................. | 375/200 |
| 5,438,329 A | 8/1995 | Gastouniotis et al. | .. | 340/870.02 |
| 5,448,570 A | 9/1995 | Toda et al. | ................. | 370/95.3 |
| 5,450,088 A | 9/1995 | Meier et al. | ................... | 342/51 |
| 5,452,465 A | 9/1995 | Geller et al. | ................. | 395/800 |
| 5,455,533 A | 10/1995 | Köllner | ....................... | 327/484 |
| 5,455,544 A | 10/1995 | Kechkaylo | .................... | 332/103 |
| 5,455,822 A | 10/1995 | Dixon et al. | ................... | 370/18 |
| 5,457,713 A | 10/1995 | Sanderford, Jr. et al. | ... | 375/206 |
| 5,461,558 A | 10/1995 | Patsiokas et al. | ............ | 364/145 |
| 5,463,657 A | 10/1995 | Rice | .......................... | 375/200 |
| 5,473,322 A | 12/1995 | Carney | ................... | 340/870.02 |
| 5,475,742 A | 12/1995 | Gilbert | ........................ | 379/106 |
| 5,475,867 A | 12/1995 | Blum | ........................ | 455/53.1 |
| 5,479,442 A | 12/1995 | Yamamoto | .................. | 375/206 |
| 5,481,259 A | 1/1996 | Bane | ..................... | 340/870.03 |
| 5,491,473 A | 2/1996 | Gilbert | ................... | 340/870.01 |
| 5,493,287 A | 2/1996 | Bane | ..................... | 340/825.52 |
| 5,495,239 A | 2/1996 | Ouellette | ............... | 340/870.02 |
| 5,497,424 A | 3/1996 | Vanderpool | .................. | 380/34 |
| 5,499,243 A | 3/1996 | Hall | .......................... | 370/85.8 |
| 5,500,871 A | 3/1996 | Kato et al. | .................. | 375/208 |
| 5,511,188 A | 4/1996 | Pascucci et al. | ............. | 395/600 |
| 5,519,388 A | 5/1996 | Adair, Jr. | ................ | 340/870.02 |
| 5,522,044 A | 5/1996 | Pascucci et al. | ........ | 395/200.06 |
| B 4,749,992 | 6/1996 | Fitzmeyer et al. | ...... | 340/870.02 |
| 5,526,389 A | 6/1996 | Buell et al. | ................. | 375/200 |
| 5,528,507 A | 6/1996 | McNamara et al. | ........ | 364/483 |
| 5,528,597 A * | 6/1996 | Gerszberg et al. | ......... | 370/95.3 |
| 5,535,267 A * | 7/1996 | Schull | ................... | 379/106.03 |
| 5,539,775 A | 7/1996 | Tuttle et al. | ................. | 375/200 |
| 5,541,589 A | 7/1996 | Delaney | ................ | 340/870.02 |
| 5,544,036 A | 8/1996 | Brown, Jr. et al. | ......... | 364/145 |
| 5,546,424 A | 8/1996 | Miyake | ...................... | 375/206 |
| 5,548,527 A | 8/1996 | Hemminger et al. | ........ | 364/492 |
| 5,548,633 A | 8/1996 | Kujawa et al. | ................ | 379/93 |
| 5,553,094 A | 9/1996 | Johnson et al. | ............. | 375/200 |
| 5,555,508 A | 9/1996 | Munday et al. | .............. | 364/492 |
| 5,559,870 A | 9/1996 | Patton et al. | ................ | 379/107 |
| 5,566,332 A | 10/1996 | Adair et al. | ................. | 395/600 |
| 5,572,438 A | 11/1996 | Ehlers et al. | ............... | 364/492 |
| 5,590,179 A | 12/1996 | Shincovich et al. | ........ | 379/107 |
| 5,592,470 A | 1/1997 | Rudrapatna et al. | ......... | 370/320 |
| 5,594,740 A | 1/1997 | LaDue | ........................ | 379/59 |
| 5,602,744 A | 2/1997 | Meek et al. | ............ | 364/464.22 |
| 5,619,685 A | 4/1997 | Schiavone | ................... | 395/500 |
| 5,621,629 A | 4/1997 | Hemminger et al. | .......... | 363/56 |
| 5,627,759 A * | 5/1997 | Bearden et al. | ............... | 702/62 |
| 5,631,636 A | 5/1997 | Bane | ..................... | 340/825.69 |
| 5,640,679 A | 6/1997 | Lundqvist et al. | .......... | 455/33.2 |
| 5,659,300 A | 8/1997 | Dresselhuys et al. | .. | 340/870.02 |
| 5,680,456 A * | 10/1997 | Baker et al. | .................. | 705/71 |
| 5,684,472 A | 11/1997 | Bane | ..................... | 340/870.02 |
| 5,684,799 A | 11/1997 | Bigham et al. | ............. | 370/397 |
| 5,691,715 A | 11/1997 | Ouellette | ................ | 340/870.09 |
| 5,692,180 A | 11/1997 | Lee | ............................ | 395/610 |
| 5,696,501 A | 12/1997 | Ouellette et al. | ....... | 340/870.02 |
| 5,696,765 A | 12/1997 | Safadi | ......................... | 370/436 |
| 5,699,276 A | 12/1997 | Roos | ....................... | 364/514 A |
| 5,715,390 A | 2/1998 | Hoffman et al. | ......... | 395/188.01 |
| 5,717,604 A | 2/1998 | Wiggins | ................ | 364/514 C |
| 5,719,564 A * | 2/1998 | Sears | .................... | 340/870.02 |
| 5,745,901 A | 4/1998 | Entner et al. | ................ | 707/103 |
| 5,748,104 A | 5/1998 | Argyroudis et al. | ... | 340/870.11 |

| | | | |
|---|---|---|---|
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,805,712 A | 9/1998 | Davis | 380/50 |
| 5,808,558 A | 9/1998 | Meek et al. | 340/870.01 |
| 5,822,521 A | 10/1998 | Gartner et al. | 395/200.6 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/502 |
| 5,897,607 A | 4/1999 | Jenney et al. | 702/62 |
| 5,898,387 A | 4/1999 | Davis et al. | 340/870.02 |
| 5,910,799 A | 6/1999 | Carpenter et al. | 345/333 |
| 5,943,375 A | 8/1999 | Veintimilla | 375/355 |
| 5,963,146 A | 10/1999 | Johnson et al. | 340/870.01 |
| 6,000,034 A | 12/1999 | Lightbody et al. | 713/202 |
| 6,041,056 A | 3/2000 | Bigham et al. | 370/395 |
| 6,067,029 A | 5/2000 | Durston | 340/870.03 |
| 6,073,174 A | 6/2000 | Montgomerie et al. | 709/224 |
| 6,078,251 A | 6/2000 | Landt et al. | 340/10.41 |
| 6,078,909 A | 6/2000 | Knutson | 705/59 |
| 6,088,659 A * | 7/2000 | Kelley et al. | 702/62 |
| 6,100,817 A | 8/2000 | Mason, Jr. et al. | 340/870.02 |
| 6,112,192 A | 8/2000 | Capek | 705/59 |
| 6,150,955 A | 11/2000 | Tracy et al. | 340/870.02 |
| 6,160,993 A | 12/2000 | Wilson | 455/12.1 |
| 6,172,616 B1 | 1/2001 | Johnson et al. | 340/870.12 |
| 6,199,068 B1 | 3/2001 | Carpenter | 707/100 |
| 6,246,677 B1 | 6/2001 | Nap et al. | 370/346 |
| 6,351,223 B1 * | 2/2002 | DeWeerd et al. | 340/870.03 |
| 6,785,592 B1 * | 8/2004 | Smith et al. | 700/291 |

OTHER PUBLICATIONS

Internet Printout, http://www.ardis.com "Ardis Two–Way, Wireless Data Communications," ARDIS, Sep. 23, 1998.

Internet Printout, http://ww.ardis.com/RADIO, "An Overview of Radio Coverage," Sep. 29, 1998, "Radio Propagation," Sep. 29, 1998, "Factors Affecting ARDIS Coverage," Sep. 29, 1998, "The ARDIS Network Compared to Other Systems," Sep. 29, 1998.

Internet Printout, http://www.ardis.com/RADIO, "Radio Coverage," Sep. 29, 1998, "Glossary of Terms," Sep. 29, 1998, "Radio Propagation in Free Space," Sep. 29, 1998, "Real World Propagation Variations," Sep. 29, 1998, "Probability of Reception vs. Calculation," Sep. 29, 1998.

Markwalter, B. E. et al., "CEBus Network Layer Description," *IEEE Transactions on Consumer Electronics*, Aug. 1989, 35(3), 571–576.

"MV–90 Read Only System" UTS Software Solutions For Utility Customers. (No Date). (No Page Numbers or Pages).

Newton, H., *Newton's Telecom Dictionary*, CMP Books, 17$^{th}$ Ed., 2001, Pages: LAN (p. 394); CEBUS (p. 134).

Rappaport, T. S., "Wireless Communications, Principles and Practice," Prentice Hall PTR, 1996, pp. 410–413.

\* cited by examiner

AUTOMATED ON-SITE METER REGISTRATION CONFIRMATION USING A PORTABLE, WIRELESS COMPUTING DEVICE

FIELD OF THE INVENTION

The invention generally relates to the field of metering and metering systems. More particularly, the invention relates to verifying the proper installation, configuration, and communication connectivity of meters.

BACKGROUND OF THE INVENTION

Since its infancy, meters have been used to capture usage information for billing, load survey, and other purposes. Meters have progressed from simple electromechanical devices that require human meter readers to more sophisticated electronic meters that can be equipped with remote communication options. These electronic meters typically have computer processors capable of capturing and storing more detailed data and transmitting this data over communication networks to a remote computer network. The remote computer network collects, processes, and stores this metered data to support different back-office business processes like billing, load survey, customer service, and automated meter reading (AMR) to name a few.

Although the data collection and reporting processes have evolved with the advancement in metering technologies, the meter installation process has continued to be a painstaking, labor-intensive, paper-based process rife with the potential for human error. As the metering devices have become more sophisticated with many configurable options, the back-office business processes also have increased in sophistication and complexity. The increase in complexity of both the metering devices and the back-office business processes, have combined to significantly increase the potential for human error in the labor-intensive, paper-based meter installation process. In particular, today a meter installer typically leaves the installation site without having received a positive confirmation that the meter was properly installed and correctly configured to support the desired back-office business processes. This is so, in part, because positive confirmation or verification of a proper meter installation requires the interaction of the on-site installer with an operator at the remote computer network location.

As with any segregated process, the logistics of such verification are plagued by various complications including scheduling and ownership. In particular, the on-site meter installer typically completes an installation and submits paperwork to a computer data entry operator. Days or even weeks later, the data entry operator receives the paperwork and attempts to establish communication with the meter. If the operator determines from the paperwork that either the wrong metering device was installed or the metering device was configured incorrectly, the operator must then schedule another installer to re-visit the meter site. Even if the installer is able to speak directly with the operator, for example with a portable telephone, the installer cannot visually perceive what occurs at the remote network location, nor can the operator see what occurs on-site at the meter location. This manual process is further complicated by today's era of utility deregulation that ofen divides the installation process among multiple, separate entities. For example, a utility company may own and distribute the meter, a meter service provider may install the meter, and an information service provider may operate the remote network and back-office processes.

Moreover, when the back-office business processes include automated meter reading (AMR) systems, the need for immediate, on-site verification of the meter installation increases dramatically. AMR systems must be capable of remotely communicating with the meter following the physical installation of the meter. Additionally, communication between AMR systems and individual meters may occur through many different communication media. For example, one meter may be equipped with a land-line telephone modem that requires the installer to connect the meter to a telephone line, while another meter may be equipped with a radio frequency (RF) modem that requires the installer to verify proper RF coverage at the installation site. When a meter installation includes remote communication in order to participate in an AMR system, there is an increased need to verify proper installation before leaving the site because the installation verification includes the verification of communication between the AMR system and the meter.

Therefore, a need exists to allow the on-site meter installer to be able to do at least the following: verify the meter's correct installation, ensure its proper configuration, and verify proper remote communication coverage, for example.

SUMMARY OF THE INVENTION

The invention is directed to a method and system for verifying an installation of a meter, for example, and electric power meter. The inventive method includes identifying the electric power meter to a central computer using a mobile computing device. The electric power meter receives computer-executable instructions from the central computer via the mobile computing device, and transmits meter information (e.g., power consumption readings, meter identification information, and meter location) to the central computer. The meter information received from the central computer is compared with meter information available at the electric power meter. The comparison may be accomplished visually by reading the meter and comparing the readings with the information received on the mobile computing device. Also, the comparison may be accomplished automatically by the mobile computing device based on the information it receives from the central computer and the information it receives from the electric power meter.

BRIEF DESCRIPTION OF THE DRAWINGS

FIG. 1*is* a block diagram of a system for verifying the installation of a meter, according to the invention;

DETAILED DESCRIPTION OF ILLUSTRATIVE EMBODIMENTS

Figure 1:
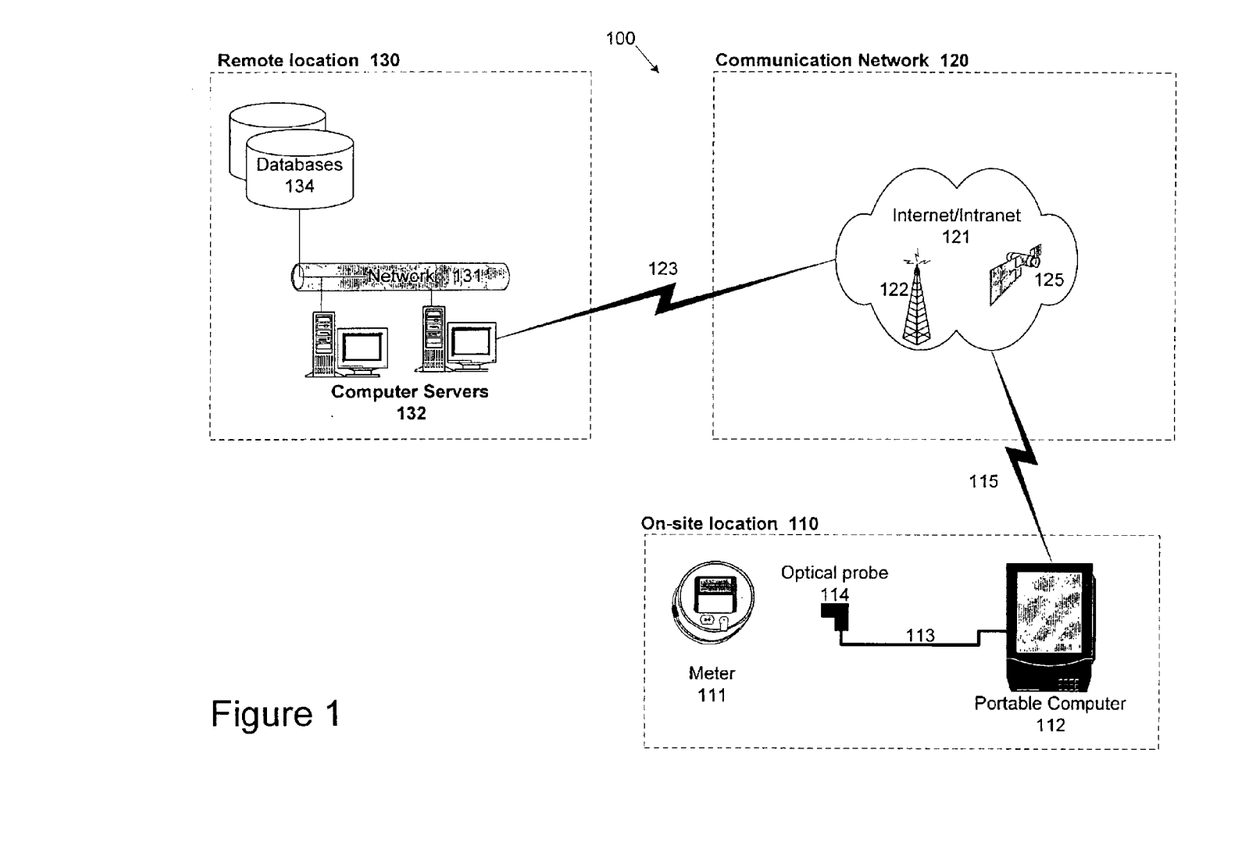

FIG. 1 is a block diagram of a system 100 for immediately verifying an installation of a non-communicative meter 111. Although meter 111 is shown in FIG. 1 as an electric power meter, it should be appreciated that system 100 may include any type of meter including, for example, an electrical power meter, a gas meter, and/or a water meter. Similarly, although other components are shown in FIG. 1, it should be appreciated that the invention is not limited to the components shown in FIG. 1, but are provided for the purposes of illustrating an embodiment of the invention.

As shown in FIG. 1, system 100 may include an on-site location 110, a remote location 130, and a communication network 120. Although not shown specifically in FIG. 1, a power line for a metered service provided by a distribution or transmission portion of a power system, for example, provides power to meter 111. As is well known to those skilled in the art, meter 111 is designed to collect information on the metered service. For example, where meter 111 is an electric meter, the meter may collect and measure performance data such as current, voltage, power quality, and load profile, etc. Similarly, for other types of meters, meter 111 may collect and measure other types of usages.

On-site location 110 may be any residential, commercial, and/or industrial location such that meter 111 is installed on a customer premise to collect usage information of the customer premise. It should be appreciated that the term "on-site" is used throughout to refer to a location in close proximity to installation of meter 111, and the term "remote" is used to describe any location that may not be in close proximity to meter 111. On-site location 110 may include meter 111 and a portable, wireless computer device (PCD) 112. For example, PCD 112 may include such devices a personal digital assistant (PDA), a laptop having a wireless modem or connected to a cellular telephone, and/or a computer-capable cellular telephone, etc.

Communication network 120 may include radio frequency (RF) tower-based 122 components (e.g., using Cellular Digital Packet Data (CDPD), and/or Global System for Mobile Communications (GSM), etc.), and/or RF satellite-based 125 communications components. In addition, communication network 120 may include other types of wired or wireless networking components. The components at on-site location 110 (e.g., PCD 112) may communicate with communication network 120 using any type of communication technique including modems, wide area network/local area network (WAN/LAN) using transmission control protocol/internet protocol (TCP/IP), and/or wired communications using typical communication protocols well known to those skilled in the art. In addition, it should be appreciated that meter 111 may communicate with PCD 112 using any communication technique well known to those skilled in the art, including an optical probe 114 or some other method (e.g., wired serial connection, etc.). Also, as shown in FIG. 1 communication network 120 may include various combinations of networks, including an internet/intranet network 121.

Remote network 130 may include one or more network servers 132 and computer databases 134. Network servers 132 and computer databases 134 may provide and store information needed to ensure the proper installation of meter 111. For example, computer databases 134 may store files (for example, meter programs, meter protocols, and meter firmware, etc.) needed by an installer of meter 111 to ensure proper installation and configuration. A computer network 131 (e.g., a WAN/LAN network), databases 134, and servers 132 communicate using typical database/server techniques, well known to those skilled in the art. It should be appreciated that computer network 131, network servers 132, and computer databases 134 may represent a plurality of computing components. For example, as discussed with reference to FIG. 3, the computer network may include computing devices (e.g. servers) including an automatic meter reading system, a web server, a work management system, an asset management system, a customer service representative system, a customer information system, and/or a customer billing system, etc.

The files stored in computer databases 134 may allow PCD to communicate with meter 111 (e.g., drivers), and/or files for installation and configuration of meter 111. The files stored in computer databases 134 also may include data corresponding to data collection requirements, for example, the type of data to be collected (e.g., kilowatt hours) and/or an interval of data collection (e.g., hours, days, etc.). Computer databases 134 also may include certain textual instructions that provide an installer of meter 111 with, for example, step-by-step instructions for physically installing and electronically programming meter 111. These textual instructions may be delivered to the installer's PCD 112 using a hypertext markup language (HTML) or an extensible markup language (XML), both of which are well known to those skilled in the art.

Meter 111 may be an electronic meter capable of collecting performance data and transmitting the performance data (e.g., power usage measurements) over a communication link, like that provided by optical probe 114. Also, PCD 112 may be any device capable of communicating over a communication network. For example, PCD 112 may be a laptop computer, a handheld computer (Palm™, Handspring™, etc.), and/or a wireless telephone. Communication between PCD 112 and meter 111 also may occur over a wired connection 113.

It should be appreciated that the components at on-site location 110 may receive other data communications, as well as those previously discussed. These other data communications may include, for example, data that facilitates identifying a reference location of on-site location 110. For example, as shown in FIG. 1, a satellite 125 may be part of communication network 120 and may communicate with on-site location 110 transmitting information (for example, global positioning, longitude and latitude, etc.). Although not shown in FIG. 1, it should be appreciated that any other external data relevant to the installation and verification of meter 111 similarly may be received by equipment at on-site location 110.

On-site location 110 is in communication with remote location 130 over a communication network 120 made up of various components, as shown in system 100. As will be discussed with reference to FIG. 2, meter 111 may communicate with communications network 120 via a base station 122 and/or a satellite 125 over communication link 115 (e.g., a RF network that may be either whether proprietary/private or public, for example using (e.g., Motient™, CDPD, and GSM, etc.), and/or a telephone line. Also, PCD 112 may communicate with communications network 120 via a public RF communication link 115 (e.g., using CDPD and GSM, etc.) that may be capable of supporting communications with intranet/internet 121.

Base station 122 may be a receiver/transmitter-equipped location capable of transmitting and receiving communications, for example RF communications. Also, it should be appreciated that an example of a communications satellite 125 may be a low-earth orbiting satellite system. It should be appreciated that the network components of system 100 are not exclusive, but provide one example of such a communication network that allows on-site location 110 to communicate with remote location 130. Other communication systems may include a private network, an RF network, a local area network (LAN), and/or a wide-area network (WAN).

Figure 2:
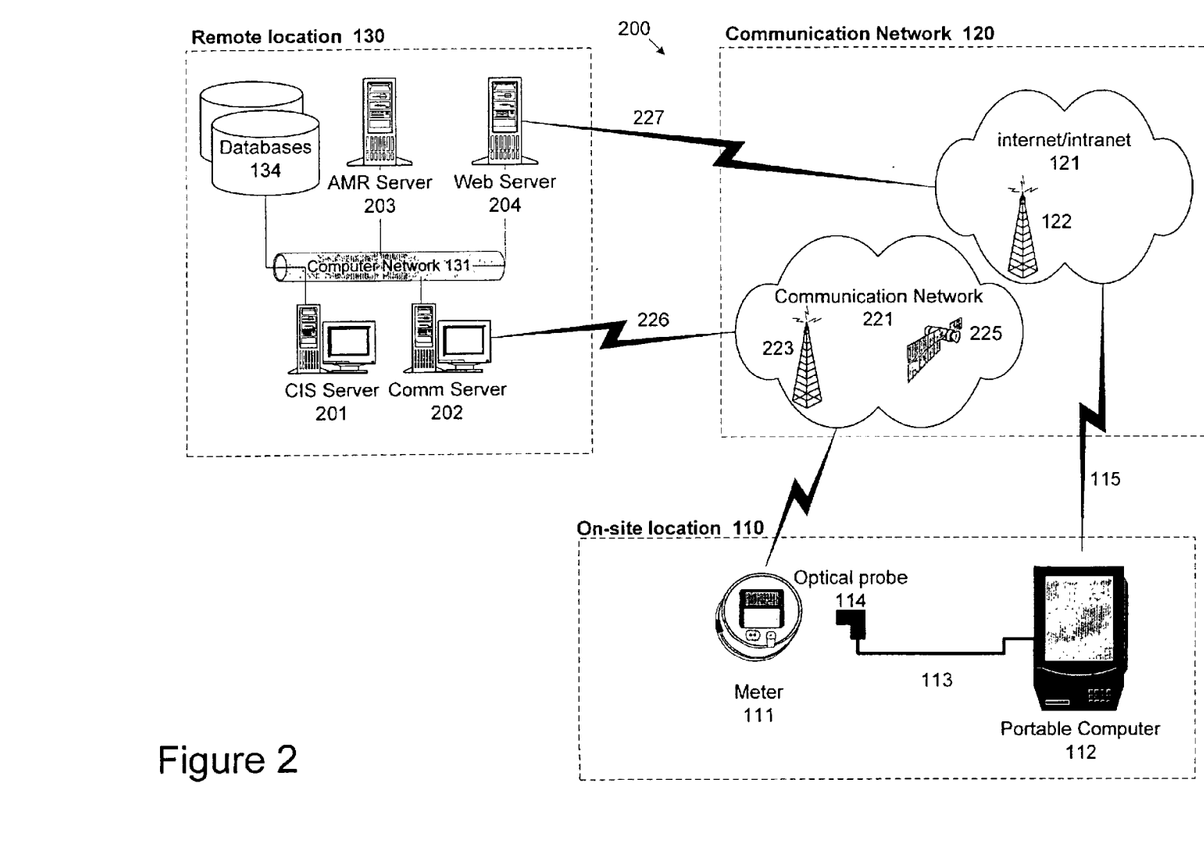
FIG. 2 is a block diagram of another system for verifying the installation of a meter, according to the invention.

FIG. 2 is a block diagram of a system 200 for verifying an installation of a communicating meter 111 that functions similar to system 100 discussed with reference to FIG. 1. System 200 includes other components that may be found in a system that permits verification of the installation of the meter.

As shown in FIG. 2, remote location 130 includes a computer information service (CIS) server 201, a communication server 202, an automatic meter reading (AMR) server 203 and a Web server 204. Each of servers 201–204 may serve different functions depending on the nature of the communication with meter 111. For example, Web server 204 may operate to communicate with PCD 112, so as to allow AMR server 203 to capture and exchange information collected about meter 111 via PCD 112. In addition, communication server 202 may operate to communicate with meter 111, so as to allow AMR server to capture and exchange information directly with meter 111. In either case, it should be appreciated that the servers designated in FIG. 2 are provided for the purposes of illustration only, and are not meant to be exclusive of the required or desired functionality.

A communication link between remote location 130 and meter 111 is facilitated by communication network 120. In system 200, a communication network 221 may include a base station 223 and/or a satellite communication device 225. Communication network 221 provides a communication path from communication server 202, for example, to meter 111 over link 226. Once link 226 has been established, AMR server 203 and communication server 202 may operate to send and receive information from meter 111 via base station 223, satellite communication device 225, or other means including a telephone line, and/or private WAN, etc. Similarly, AMR server 203 and Web server 204 may communicate with PCD 112 via link 227 and internet/intranet 121. Therefore, FIG. 2 illustrates a technique for providing individual means of communication between meter 111 and its servers (AMR server 203 and communication server 202), and PCD 112 and its servers (AMR server 203 and Web server 204).

Figure 3:
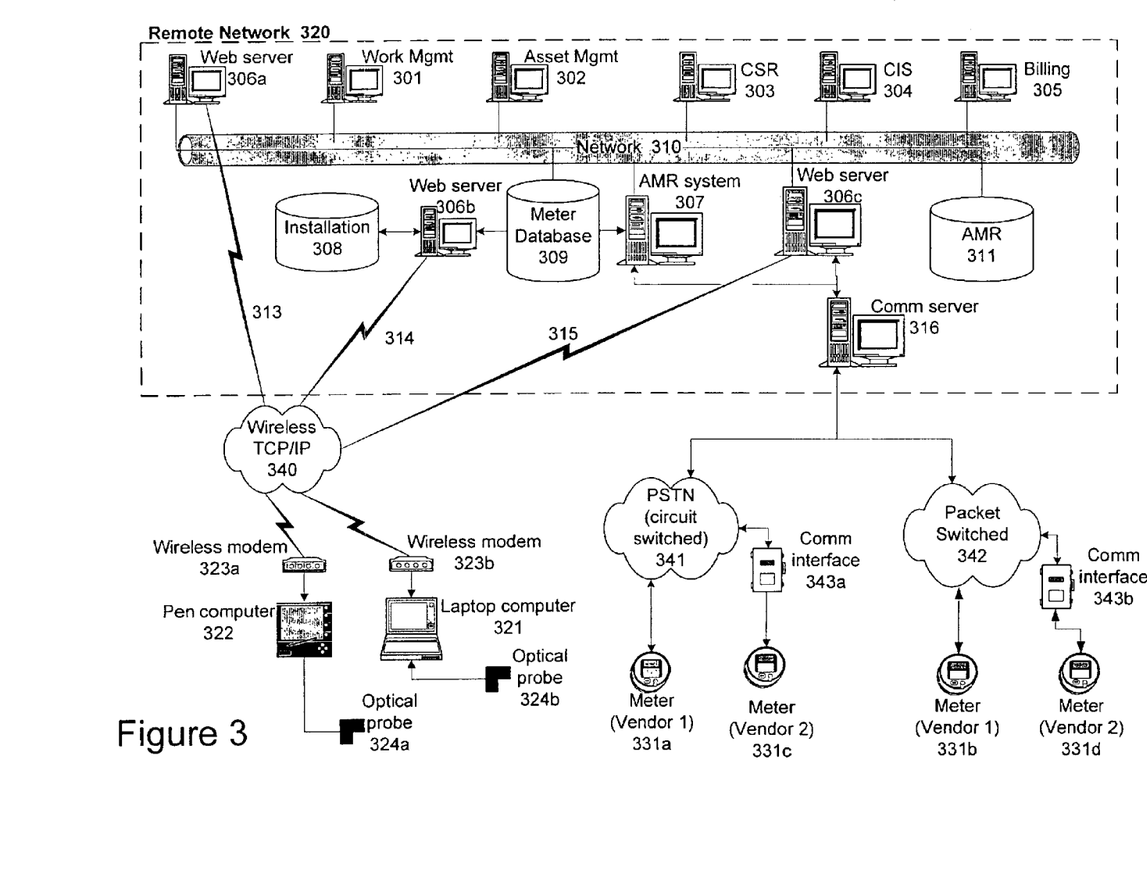
FIG. 3 is a block diagram of an enterprise-level system integrated to support on-site, remote, meter registration confirmation, according to the invention.

FIG. 3 is a block diagram of an enterprise-level system integrated to support on-site, remote meter registration confirmation. In particular, FIG. 3 provides one example of a distributed computing system that may be accomplished to provide meter registration confirmation.

As shown in FIG. 3, remote network 320 may include a number of various computing systems having certain responsibilities. For example, remote network 320 may include an installation database 308 and a meter database 309. Remote network 320 also may include a number of computing systems including, for example, a work management system 301, an asset management system 302, a customer service representative (CSR) system 303, a customer information system (CIS) 304, and a billing system 305. These components may be connected to a network 310 to other interface components, for example, Web servers 306a–c and an AMR system 307. Web servers 306a–c may have access to data-specific databases including installation specific data in installation database 308 and meter data (e.g. meter programs, meter drivers, and meter firmware, etc.) in meter database 309. Also, remote network 320 may have data related to automated meter reading in AMR database 311.

Web servers 306a–c may provide data outside to remote network 320, for example, to a wireless network 340. Wireless network 340 may be a TCP/IP-based network capable of communicating with a pen computer 322 and/or a laptop computer 321 via wireless modems 323a and 323b, respectively. Also, pen computer 322 and laptop computer 321 may be capable of communicating with optical probes 324a–b. Optical probes 324a–b may be directed toward an optical output port on meters 331a–d so as to read data captured and stored with the meters. Web server 306c, for example, may be in communication with a communication server 316. Communication server 316 may facilitate communication between web server 306c in remote network 320 with meters 331a–d. In particular, communication server 316 may transmit and/or receive data from meters 331a and 331c via public switched telephone network (PSTN) 341. Also, communication server 316 may transmit and/or receive data from meters 331b and 331d via packet-switched network 342. In the case of meters from certain vendors (e.g., meter 331c and meter 331d) communication interfaces 343a–b may be required to communicate with the meters.

Figure 4A:
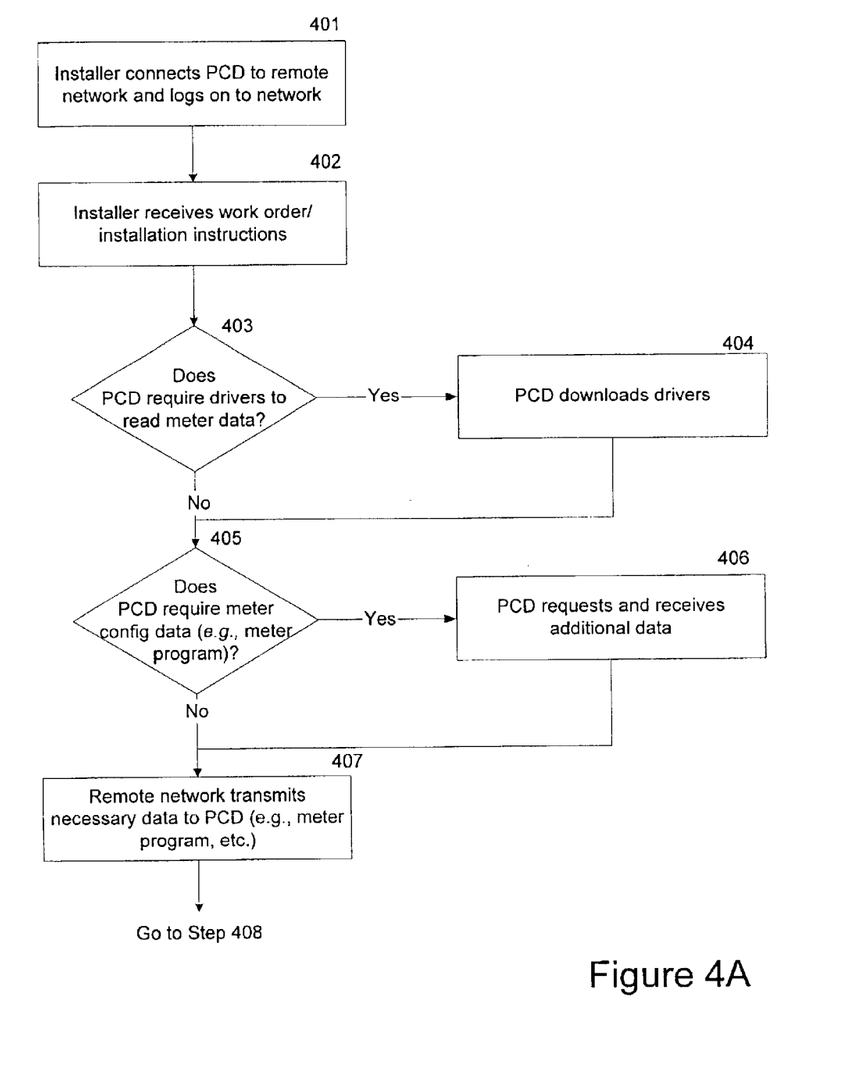
FIGS. 4A, 4B and 4C provide a process diagram of a method for accomplishing on-site, remote, meter registration confirmation, according to the invention.
Figure 4B:
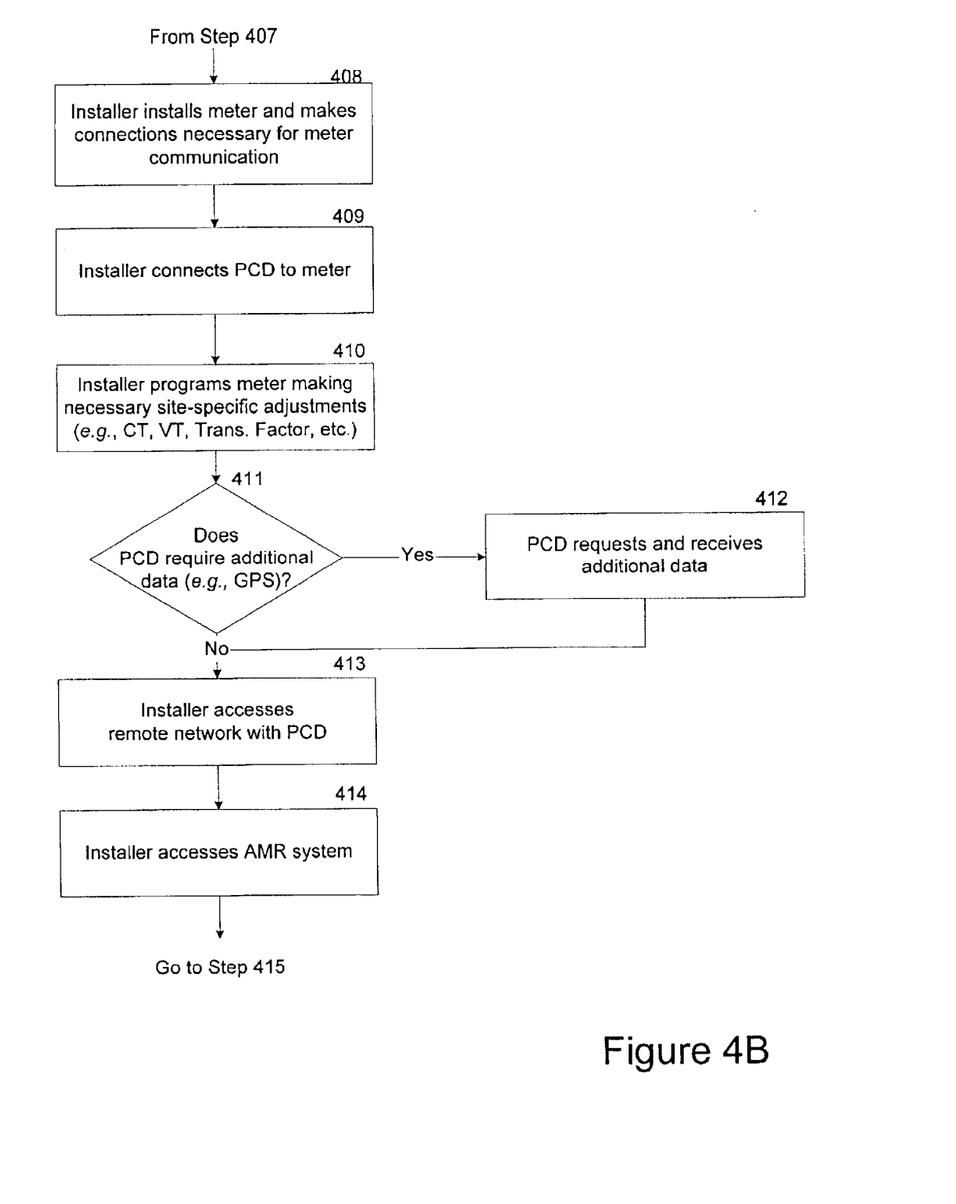
Figure 4C:
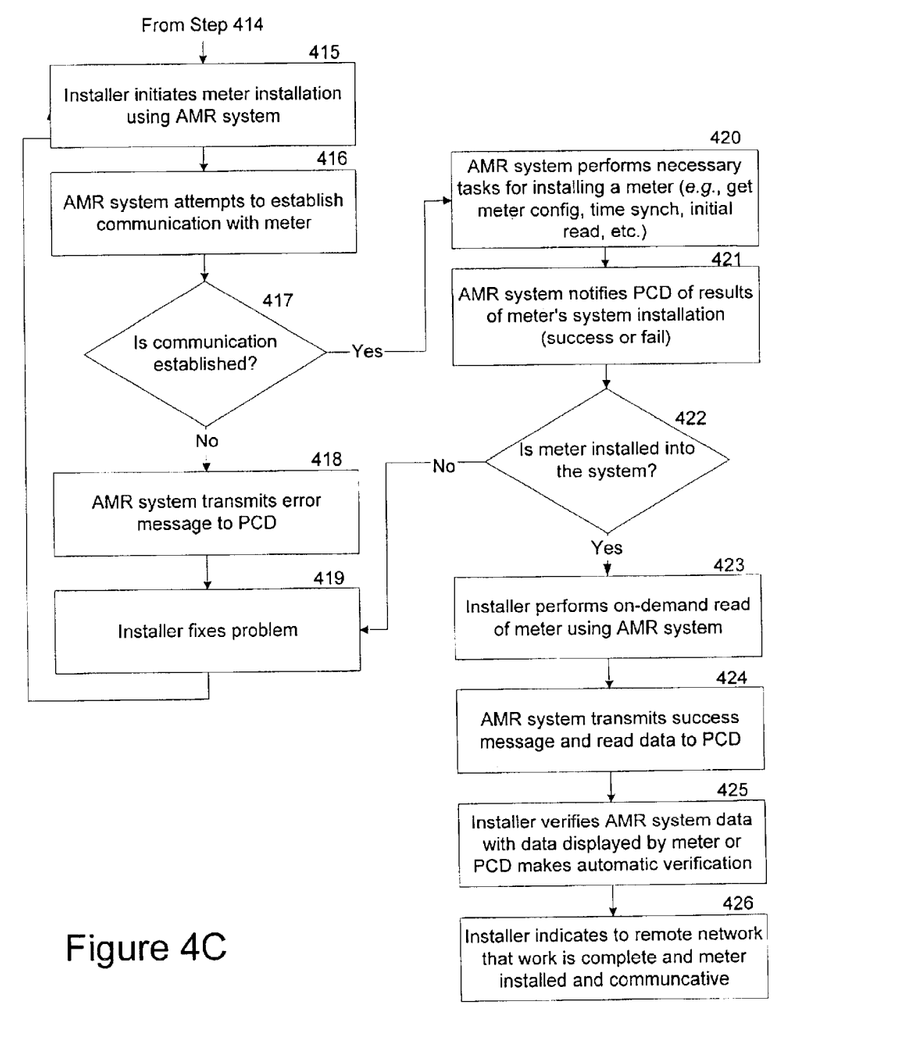

FIGS. 4A, 4B and 4C provide a process diagram of a method for accomplishing on-site, remote, meter registration confirmation. The process discussed with reference to FIGS. 4A, 4B, and 4C will be discussed in the context of the system shown in FIG. 3. However, it should be appreciated that the process discussed with reference to FIGS. 4A, 4B and 4C similarly may be applied to systems other than that discussed with reference to FIG. 3.

As shown in FIG. 4A, in step 401, an installer uses laptop computer 321 and/or pen computer 322 connected through wireless modem 323 to establish communication and log onto remote network 320 via Web server 306. This connection may be established in a number of different ways, for example, connecting directly to remote network's 320 network 310 or by connecting to a server 306a–c. Remote network 320 may then require the installer to enter a user name and password in order to access remote network 320. Once connected to remote network 320, laptop computer 321 and/or pen computer 322 retrieve work order information from work management system 301, in step 402. The work order information may include site-specific instructions provided by remote network database 308.

As needed, laptop computer 321 and/or pen computer 322 download meter programs, drivers, and firmware upgrades from the remote meter database 309. It is determined in step 403 if laptop computer 321 and/or pen computer 322 require additional information to read the meter's data. If laptop computer 321 and/or pen computer 322 require additional information to read the meter's data, in step 404 the meter operates to download the additional information from meter database 309. If, on the other hand, laptop computer 321 and/or pen computer 322 have the required driver to read the meter's data, it is determined whether laptop computer 321 and/or pen computer 322 require meter configuration data (e.g., meter programs), in step 405. If laptop computer 321 and/or pen computer 322 require meter configuration data then laptop computer 321 and/or pen computer 322 request and receives the additional data in step 406. If, on the other hand, laptop computer 321 and/or pen computer 322 do not require meter configuration data, in step 407 remote network 320 transmits the necessary data to laptop computer 321 and/or pen computer 322, in step 407.

As shown in FIG. 4B, in step 408, the installer installs meter 331 and makes the necessary connections that will make the meter communicative with communication network 310. Once laptop computer 321 and/or pen computer 322 have the required information, the installer connects the device to the appropriate meter 331a–d using the appropriate meter port (e.g., optical, serial, etc.), in step 409. Once connected to meter 331, laptop computer 321 and/or pen computer 322 may download the meter firmware, program the meter, perform any site-specific programming (programming current transformer ratio, voltage transformer ratio, transformer factor, etc.), perform any meter diagnostics, and program any communication specifics (e.g., telephone number, etc.) as needed, in step 410. In step 411, it is determined whether laptop computer 321 and/or pen computer 322 require additional data, for example global positioning data. If laptop computer 321 and/or pen computer 322 require additional data, laptop computer 321 and/or pen computer 322 requests and receives the additional data in step 412. If, on the other hand, no additional data is needed, in step 413 the installer uses laptop computer 321 and/or pen computer 322 to reestablish communication with remote network 320. Once laptop computer 321 and/or pen computer 322 has completed the meter configuration, the installer uses laptop computer 321 and/or pen computer 322 to initiate an install meter function to AMR system 307, in step 414.

As shown in FIG. 4C, in step 415, the installer initiates the meter installation process (e.g., protocols) required to allow meter installation, using AMR system 307. In step 416, AMR system 307 attempts to establish communication with meter 331. In step 417, it is determined whether communication between meter 331 and AMR system 307 is established. If communication between meter 331 and AMR system 307 is not established, in step 418, AMR system 307 sends an error message to laptop computer 321 and/or pen computer 322, which the installer is capable of reading and understanding. In step 419, the installer is notified and performs those tasks required to correct the situation, returning to step 415 and perhaps re-installing meter 331.

If, on the other hand, communication is established, the AMR system 307 adds meter 331 to AMR database 311 by sending a command to communication server 316, in step 420. The communication server establishes a connection with meter 331, and may accomplish a variety of functions including verifying meter configuration, retrieving meter data, synchronizing meter time, and returns message to AMR system 307. In step 421, AMR system 307 sends a message to laptop computer 321 and/or pen computer 322 indicating that meter 331 successfully or unsuccessfully has been added to AMR database 311. In step 422, it is determined whether the meter is installed into the system. If the meter is not installed into the system, the installer attempts to fix the problem in step 419, and perhaps reinstalls the meter in step 415.

If, on the other hand, meter 331 is determined to be properly installed into the system in step 422, the installer initiates an on-demand read of meter 331 via AMR system 307 or via another application for on-site installation verification of meter registration in step 423, as shown in FIG. 4C. In step 424, AMR system 307 transmits a success message and the read data to laptop computer 321 and/or pen computer 322. Once meter 331 has been read successfully by remote network 320, the installer verifies that meter 331 as received by AMR system 307 and read by laptop computer 321 and/or pen computer 322 are correct, in step 425. This may be accomplished either with a visual reading of the display of meter 331 and/or by laptop computer 321 and/or pen computer 322 automatically may verify the meter data with data retrieved via direct connection 324 (e.g.; optical probe, serial port, etc.) to meter 331.

The installer may then mark the installation as complete and notify the remote network's various servers (e.g., work management, billing, asset management, etc.) of completion, in step 426. Once the work order has been completed, the remote network's servers may be updated to show the new disposition of the installed meter. Once meter 331 has been correctly installed and registered within the remote network, other systems (e.g., customer service 303, billing system 305, etc.) at remote network location 320 can access the meter data via AMR system 307 and communication server 316.

This invention provides a system and method for verifying the installation of a meter. It is noted that the foregoing examples have been provided merely for the purpose of explanation and are in no way to be construed as limiting of the invention. While the invention has been described with reference to preferred embodiments, it is understood that the words that have been used herein are words of description and illustration, rather than words of limitations. Further, although the invention has been described herein with reference to particular means, materials and embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Those skilled in the art will appreciate that various changes and adaptations of the invention may be made in the form and details of these embodiments without departing from the true spirit and scope of the invention as defined by the following claims.

What is claimed is:

1. A method of verifying an installation of a meter, comprising:
   identifying said meter to a central computer using a mobile computing device;
   verifying that said meter is in communication with said central computer;
   inputting to said meter computer-executable instructions received from said central computer via said mobile computing device;
   transmitting meter information to said central computer from said meter; and
   comparing said meter information received to said mobile computing device via said central computer with meter information available at said meter.

2. The method of claim 1, wherein said computer-executable instructions allow said mobile computing device to receive said meter information from said central computer.

3. The method of claim 1, wherein said meter is at least one of the following: an electric power meter, a gas meter, and a water meter.

4. The method of claim 1, wherein said computer-executable instructions allow said meter to communicate with said central computer.

5. The method of claim 1, wherein said computer-executable instructions identify data collection requirements to said meter.

6. The method of claim 5, wherein said data collection requirements comprise at least one of the following: data collection types and data collection intervals.

7. The method of claim 1, wherein said computer-executable instructions are an updated version of previous computer-executable instructions.

8. The method of claim 1, wherein said computer-executable instructions include meter firmware.

9. The method of claim 1, wherein said computer-executable instructions update data collection requirements to said meter.

10. The method of claim 1, further comprising receiving installation instructions from said central computer to said mobile computing device.

11. The method of claim 1, further comprising receiving external data to said mobile computing device.

12. The method of claim 1 wherein said external data comprises at least one of the following: global positioning data, latitude and longitude data, and bar code reader data.

13. The method of claim 1, further comprising identifying installation-specific information to said central computer using said mobile computing device.

14. The method of claim 13, wherein said installation-specific information comprises at least one of the following: current transformer ratio, power transformer ratio, and meter location.

15. The method of claim 1, further comprising receiving said meter information available at said meter from said meter to said mobile computing device.

16. The method of claim 15, further comprising storing in said mobile computing device said meter information available at said meter.

17. The method of claim 16, wherein said comparing comprises automatically analyzing said stored meter information with said received meter information.

18. The method of claim 1, wherein said comparing comprises visually analyzing said meter information available at said meter with said received meter information.

19. The method of claim 1, wherein said meter information includes at least one of the following: power consumption readings, meter identification information, and meter location.

20. The method of claim 19, wherein meter identification information includes at least one of the following: a directory number of said meter, a type of said meter, a manufacturer of said meter, a serial number of said meter, and a mobile identification number of said meter.

21. The method of claim 1, wherein said identifying comprises receiving a query at said mobile computing device from said central computer.

22. The method of claim 1, wherein said identifying comprises providing at least one of the following to said central computer: a directory number of said meter, a type of said meter, a manufacturer of said meter, a serial number of said meter, and a mobile identification number of said meter.

23. The method of claim 1, wherein said mobile computing device initiates communication with said central computer.

24. The method of claim 1, further comprising receiving a validation request from said central computer.

25. The method of claim 1, further comprising inputting to said meter other computer-executable instructions received from said central computer.

26. The method of claim 1, wherein based on said comparing, said mobile computing device receives a signal from said central computer.

27. The method of claim 26, wherein said signal comprises at least one of the following: a verification message indicating proper installation, a request message requiring additional data be transmitted to said central computer, a textual instruction message, and a reinstallation message requiring that said computer-executable instructions be re-inputted to said meter.

28. A method of verifying an installation of a meter, comprising:
  receiving identification data for said meter from a mobile computing device;
  transmitting computer-executable instructions based on said meter to said mobile computing device;
  receiving meter performance information from said meter; and
  transmitting said meter performance information to said mobile computing device via said central computer.

29. The method of claim 28, further comprising storing said meter performance information.

30. The method of claim 28, further comprising storing said identification data.

31. The method of claim 28, wherein said meter is at least one of the following: an electric power meter, a gas meter, and a water meter.

32. The method of claim 28, further comprising transmitting installation instructions based on said meter to said mobile computing device.

33. The method of claim 28, further comprising receiving meter performance information from said mobile computing device.

34. The method of claim 33, further comprising comparing said meter performance information received from said meter with said meter performance information received from said mobile computing device.

35. The method of claim 34, further comprising transmitting additional installation instructions to said mobile computing device based on said comparison.

36. The method of claim 28, further comprising receiving meter performance information from directly from said meter.

37. A method of installing a meter, comprising:
  selecting a meter;
  coupling said meter to an electric power line;
  establishing communication with a central computer using a mobile computing device;
  establishing communication with said meter using said mobile computing device;
  providing meter data to said central computer using said mobile computing device;
  receiving at said mobile computing device computer-executable instructions from said central computer, based on said meter data;
  providing said computer-executable instructions to said meter using said mobile computing device;
  establishing communication between said central computer and said meter;
  receiving meter information at said mobile computing device via said central computer; and
  comparing said received meter information with meter information available at said meter.

38. The method of claim 37, wherein said selecting of the meter includes at least one of the following: identifying meter configuration, identifying installation location, and identifying installation date.

39. The method of claim 37, wherein said comparing is conducted automatically by said mobile computing device.

40. The method of claim 37, further comprising providing installation instructions to said mobile computing device via said central computer, when said received meter information is sufficiently different from said meter information available at said meter.

41. The method of claim 37, wherein said meter is at least one of the following: an electric power meter, a gas meter, and a water meter.

42. The method of claim 40, wherein said installation instructions include at least one of the following: replace said meter, receive and install additional computer-executable instructions, provide additional meter data to said central computer, and reinstall said meter data.

43. The method of claim 37, further comprising verifying proper installation of said electric meter when said received meter information is substantially similar to said meter information available at said meter.

44. The method of claim 37, wherein said computer-executable instructions perform at least one of the following: allowing said mobile computing device to receive said meter information from said central computer, allowing said meter to communicate with said central computer, identifying data collection requirements to said meter, and updating data collection requirements to said meter.

45. A system for verifying an installation of a meter, comprising:
 a central database, wherein said central database stores computer-executable instructions for installing said meter;
 a central computer server in communication with said central computer database;
 a meter in communication with said central computer server over a communication network; and
 a mobile computing device in communication with said central computer server over said communication network and with said meter, wherein said mobile computing device identifies said meter to said central computer server and inputs to said meter computer-executable instructions received from said central computer.

46. The system of claim 45, wherein said mobile computing device compares meter information received from said central computer with meter information received from said meter.

47. The system of claim 45, wherein said communication network is the Internet.

48. The system of claim 45, wherein said communication network is wireless.

49. The system of claim 45, wherein said meter is at least one of the following: an electric power meter, a gas meter, and a water meter.

50. The system of claim 45, wherein said mobile computing device is a personal digital assistant.

51. The system of claim 45, wherein said mobile computing device is a laptop computer.

52. The system of claim 45, wherein said mobile computing device is a wireless telephone.

53. The system of claim 45, further comprising a global positioning system in communication with said mobile computing device.

54. The system of claim 45, further comprising a global positioning system in communication with said meter.

55. The system of claim 45, wherein said central computer server and said central database each comprise a plurality of computing components.

56. The system of claim 55, wherein said plurality of computing components include at least one of the following: an automatic meter reading system, a Web server, a work management system, an asset management system, a customer service representative system, a customer information system, and a customer billing system.

57. The system of claim 45, wherein said mobile computing device communicates with said meter via an optical probe.

58. The system of claim 45, wherein said central database stores installation instructions for said meter.

59. The system of claim 45, wherein said a meter is in communication with said central computer via the handheld computer.

60. The system of claim 45, wherein said a meter is in direct communication with said central computer.

* * * * *